United States Patent [19]
Rothballer

[11] Patent Number: 6,079,912
[45] Date of Patent: Jun. 27, 2000

[54] CUTTER INSERT FOR ROUGHING AND FINISHING

[75] Inventor: Gerhard Rothballer, Lehrberg, Germany

[73] Assignee: Widia GmbH, Essen, Germany

[21] Appl. No.: 09/117,304

[22] PCT Filed: Jan. 21, 1997

[86] PCT No.: PCT/DE97/00147

§ 371 Date: Jul. 23, 1998

§ 102(e) Date: Jul. 23, 1998

[87] PCT Pub. No.: WO97/27967

PCT Pub. Date: Aug. 7, 1997

[30] Foreign Application Priority Data

Jan. 31, 1996 [DE] Germany ............... 196 03 391

[51] Int. Cl.$^7$ ............... B26D 1/25
[52] U.S. Cl. ............... 407/114; 407/36; 407/41
[58] Field of Search ............... 407/35, 53, 99, 407/103, 113, 114, 115, 116

[56] References Cited

U.S. PATENT DOCUMENTS

| | | | |
|---|---|---|---|
| 3,279,034 | 10/1966 | Kaiser | 407/47 |
| 3,279,035 | 10/1966 | Johnson | 407/113 |
| 3,395,434 | 8/1968 | Wirfelt | 407/114 |
| 3,434,190 | 3/1969 | Kaiser | 407/113 |
| 3,762,005 | 10/1973 | Erkfritz | 407/113 |
| 3,781,956 | 1/1974 | Jones et al. | 407/113 |
| 3,805,349 | 4/1974 | Nose | 407/114 |
| 3,866,282 | 2/1975 | Lundgren | 407/113 |
| 3,882,580 | 5/1975 | Lundgren | 407/113 |
| 4,159,884 | 7/1979 | Schott | 407/113 |
| 4,214,845 | 7/1980 | Mori | 407/114 |
| 4,294,565 | 10/1981 | Erkfritz | 407/113 |
| 4,318,318 | 3/1982 | Schott | 407/113 |
| 4,681,488 | 7/1987 | Markusson | 407/114 |
| 4,692,070 | 9/1987 | Shikata | 407/113 |
| 4,971,483 | 11/1990 | Kress et al. | 407/113 |
| 5,000,626 | 3/1991 | Bernadic et al. | 407/113 |
| 5,556,239 | 9/1996 | Reiterman | 407/113 |

FOREIGN PATENT DOCUMENTS

| | | | |
|---|---|---|---|
| 0 117 400 | 9/1984 | European Pat. Off. | |
| 0 160 850 A1 | 11/1985 | European Pat. Off. | 407/113 |
| 0 166 898 A2 | 1/1986 | European Pat. Off. | 407/114 |
| 0 334 129 A2 | 9/1989 | European Pat. Off. | |
| 0 672 492 A1 | 9/1995 | European Pat. Off. | |
| 2 364 724 | 4/1978 | France. | |
| 2224-529 C2 | 12/1982 | Germany | 407/113 |
| 3618-574 A1 | 12/1986 | Germany | 407/114 |
| 40 13 717 A1 | 4/1991 | Germany. | |
| 41 37 230 A1 | 5/1993 | Germany. | |
| 44 02 759 A1 | 8/1995 | Germany. | |
| 44 19 094 A1 | 8/1995 | Germany. | |
| 92/11108 | 7/1992 | WIPO | 407/114 |
| WO 95/19238 | 7/1995 | WIPO. | |

OTHER PUBLICATIONS

UDDDEX Stirnfraser Mit Wendeplatten published by Uddeholms Aktiebolag, Sweden, dated Apr. 10, 1964.

*Primary Examiner*—Andrea L. Pitts
*Assistant Examiner*—Erica D. Ergenbright
*Attorney, Agent, or Firm*—Herbert Dubno; Andrew Wilford

[57] ABSTRACT

A cutting insert is formed with a substantially hexagonal cutting face having six sides forming three main cutting edges and three auxiliary cutting edges alternating with the main edges. Each of the main cutting edges is substantially straight and each of the auxiliary cutting edges is outwardly convex. A plateau is on the face inward of the cutting edges and defines a plane. Respective free surfaces each extend generally perpendicular to the plane from the cutting edges and meet at corners between the edges. The main cutting edges are usable for roughing and the auxiliary cutting edges for finishing. The insert is formed on the face along an entire length of and parallel to each of the cutting edge with a respective groove.

18 Claims, 6 Drawing Sheets

CUTTER INSERT FOR ROUGHING AND FINISHING

CROSS REFERENCE TO RELATED APPLICATIONS

This application is the U.S. national phase of PCT application PCT/DE97/00147 filed Jan. 21, 1997 with a claim to the priority of German application 196 03 391.8 filed Jan. 31, 1996.

FIELD OF THE INVENTION

The invention relates to a cutting insert for workpiece machining with at least one main cutting edge for roughing and with an adjacent auxiliary cutting edge for finishing.

BACKGROUND OF THE INVENTION

European 0,117,400 describes a nonagonal indexable cutting plate that has on its lower and upper sides several main and auxiliary cutting edges of different lengths and that has the form of an equilateral triangle with symmetrically beveled-off corners, the main cutting edges lying in the region of the beveled-off corners and being shorter than the secondary cutting edges. In order to make a large number of usable cutting edges in a small cutting insert it has been suggested to make the ratio of the lengths of the main cutting edges to the lengths of the secondary cutting edges between 1:1.5 and 1:3 and to merge the main cutting edges via rounded corners with the auxiliary cutting edges, the radii of the rounded corners generally corresponding to the radii of a perimeter circle of the indexable cutting plate.

OBJECT OF THE INVENTION

It is an object of the present invention to provide a cutting insert for combined roughing and finishing by means of which one can get a high surface finish. In particular the cutting insert should be usable for planar milling of gray castings.

SUMMARY OF THE INVENTION

This object is solved by the cutting insert according to the invention in that the auxiliary cutting edges which extend to a planar free face, are convexly curved. In this manner an arcuate auxiliary cutting edge is produced for finish machining and that produces a cutting depth of for example 0.5 mm and a good surface quality.

According to the invention the auxiliary cutting edge is arcuately curved at a radius between 40 mm and 50 mm.

According to a further embodiment of the invention a chip-shaping groove, preferably a concave-section chip-shaping groove, extends on the cutting surface along the entire length of the auxiliary cutting edge and parallel thereto. This chip-shaping groove, which directly adjoins on the auxiliary cutting edge, produces when installed in a tool holder positive to neutral cutting angles both axially and radially. Preferably the auxiliary-edge cutting angle is between 10° and 20°, preferably 15°. The radius of the chip-shaping groove is between 0.5 mm and 0.8 mm.

According to a further embodiment of the invention the chip-shaping groove extends to the transition region between the auxiliary cutting edge and the main cutting edge. The main-edge cutting angle is positive, preferably up to 8°.

According to a further feature of the invention the cutting insert has a central raised cutting-surface plateau that is spaced from the highest point of the cutting edges. This produces a shape that produces edge lines on the cutting surface at a spacing from the cutting edges at respective angles. The central raised cutting-surface plateau has in particular the advantage that the cutting insert can be made two-sided since then alternatively the upper or the lower cutting-surface plateau can be used as mounting surface on the seat of a tool holder for clamping it in position. Preferably the cutting insert has a generally uniform hexagonal shape with three main cutting edges and three auxiliary cutting edges that delimit the cutting surface, preferably with two parallel cutting surfaces to produce overall six main and six auxiliary cutting edges.

In order to separate the machined chip produced by the main cutting edge effectively according to a further embodiment of the invention a chip-shaping element, preferably formed as a nose-shaped extension of the central raised cutting-surface plateau, is provided generally at the level of a perpendicular to a center of and spaced from the main cutting edge. The projection has a generally triangular planar top face level with the plane of the cutting-surface plateau and having a point directed at the main cutting edge and from which point extend adjacent planar side flanks to the cutting surface, preferably at a flank angle of 40° to 50°.

The corner between the main cutting edge and the auxiliary cutting edge is rounded and is formed of several planar surfaces extending at obtuse angles of 120° to each other and to the adjacent main and auxiliary cutting edges so that it is not sharp but rounded. The cutting-corner rounding has a radius between 0.3 mm and 0.9 mm.

An object of the present invention is a tool comprising a tool holder with at least one seat for holding a cutting insert as described above. The tool can in particular be a miller. The cutting insert is set at an effective axial auxiliary cutting angle between 5° and 10°, preferably 7° to 10°. The effective radial main cutting angle is between 0° and 2°. The effective radial auxiliary cutting angle is between −5° and −10°, preferably −7° to −10°.

In order to make a deep cut and simultaneously to get a high surface quality when milling, according to a further feature of the invention a second cutting insert corresponding to the invention is used for the finish machining with limited cutting depth immediately behind one or more cutting insert without curved auxiliary edges, that is monoroughing cutters according to the prior art and used for roughing. The first cutting insert serves generally for roughing, the second for the finish machining.

BRIEF DESCRIPTION OF THE DRAWING

Embodiments of the invention are shown in the drawing. Therein.

SPECIFIC DESCRIPTION

Figure 1:
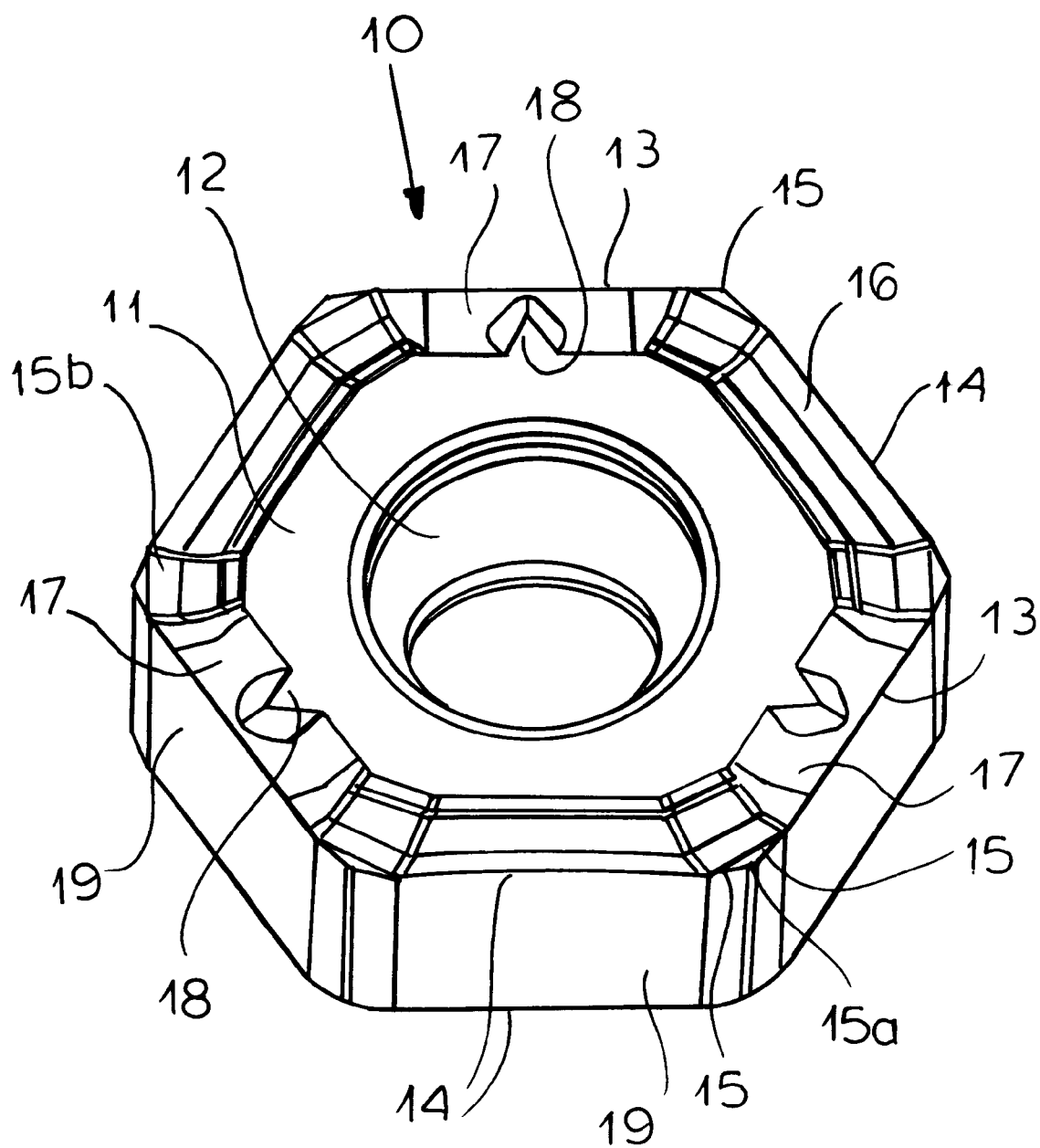
FIG. 1 is a perspective view of a cutting insert formed as an indexable cutting plate.

The cutting insert 10 shown in FIGS. 1 through 6 has a generally uniform hexagonal shape with an upper and a lower cutting surface that are each delimited by cutting edges (main and auxiliary cutting edges). The free faces extend at an angle of 0° to each other so that the cutting insert can be used on both sides. In the illustrated embodiment the cutting inset 10 has a central raised cutting-surface plateau 11 that forms a plane that is spaced from the cutting edges or from the highest point of the cutting edges so that it allows good seating in an unillustrated tool holder and thus cannot be damaged. In the center of the cutting insert is a mounting hole 12 through which a mounting screw can pass. The cutting insert 10 has on each of its cutting faces six cutting edges of which three are main cutting edges 13 and the remaining three are auxiliary cutting edges 14. The main cutting edges alternate with the auxiliary cutting edges and form therewith obtuse angles of 120°. The transition regions 15, that is the corners between each main cutting edge 13 and the adjacent auxiliary cutting edge 14 can be fully rounded or formed of several—here three—planar surfaces that again extend at an angle of 120° to each other and that merge at rounded corners. The corner rounding is shown at 15a in the illustrated embodiment. A chip-shaping groove 16 that is of generally concave shape extends parallel to and the full length of each auxiliary cutting edge 14. These chip-shaping grooves 16 each extend as shown at 15b into the transition region 15. The chip-shaping groove 17 extending along each main cutting edge 13 however descends adjacent the main cutting edge seen in section to the deepest point of the groove that has a radius of curvature of 0.5 mm whence the cutting surface rises toward the hole 12 over flanks to the level of the cutting-surface plateau 11.

Generally at a perpendicular to the center of each main cutting edge 13 there is a raised chip-shaping element 18 that is formed as a nose-shaped projection of the cutting-surface plateau. This projection has a planar generally equilateral-triangular top surface having a point directed at the center of the main cutting edge 13. A respective flank, at about an angle of 45°, extends from each edge of the top surface to the base of the groove 17. The free surfaces are each shown at 19.

Figure 2:
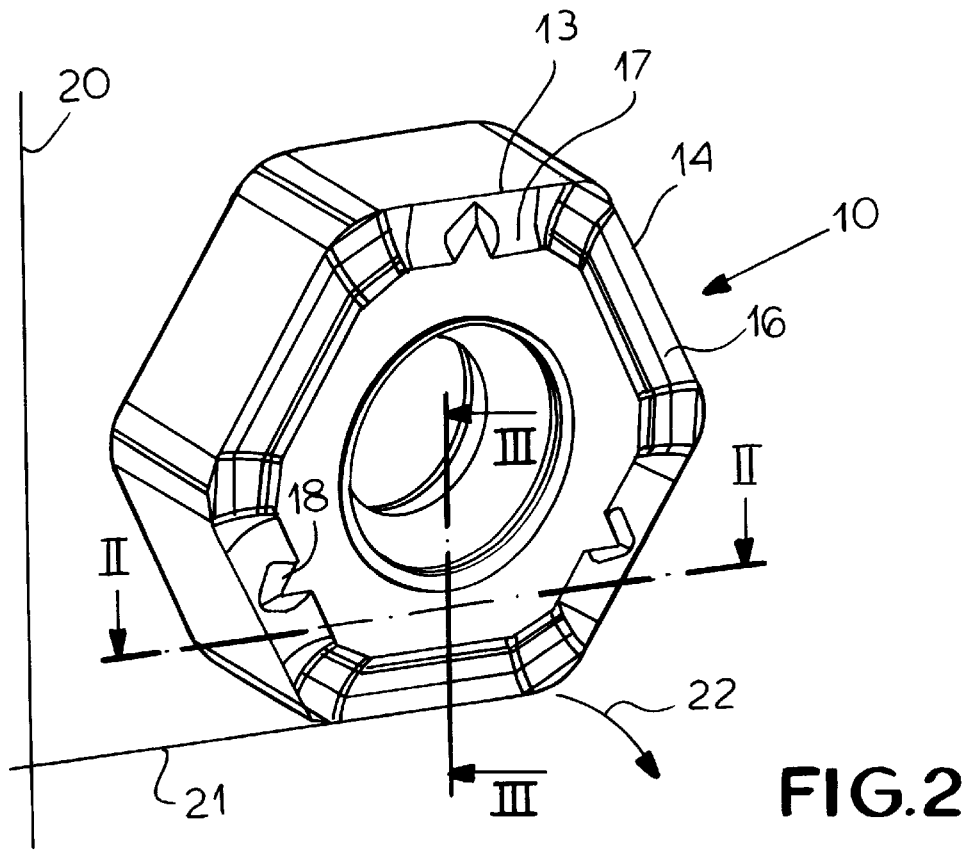
FIG. 2 is a perspective view of the same cutting insert in a particular use position.

FIG. 2 shows the cutting insert 10 (without a tool holder) in use position. The vertical axis 20 is the rotation axis of the tool used for milling and 21 is a line in the cut plane on the work-piece being machined. The cutting insert 10 orbits during machining of the workpiece as shown at 22. In this case the selected mounting position has an auxiliary cutting edge at an angle of −7° both axially and radially relative to the rotation axis or to the longitudinal axis of the tool holder.

Figure 3:
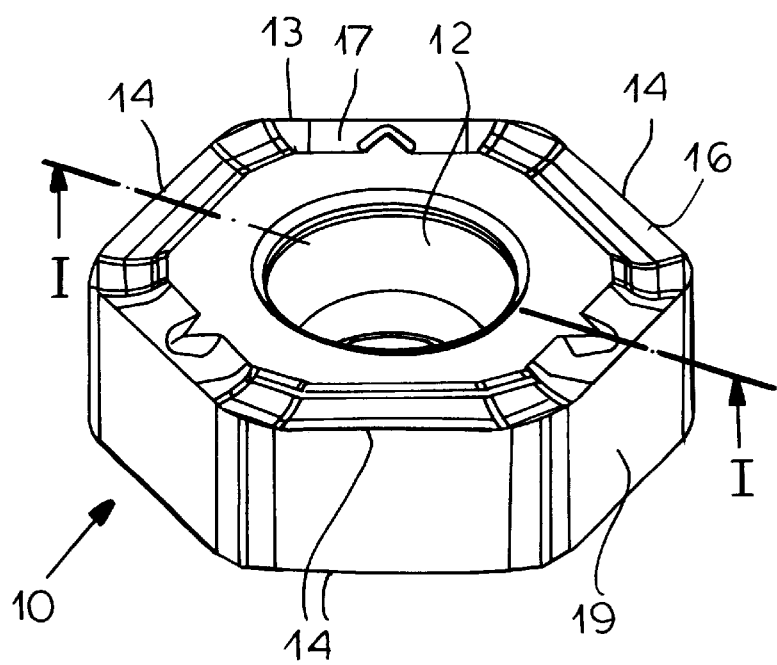
FIG. 3 is a further perspective view of the cutting insert according to FIGS. 1 and 2.

FIG. 3 shows a perspective view of the cutting insert according to FIG. 1 seen from another angle.

Figure 4:
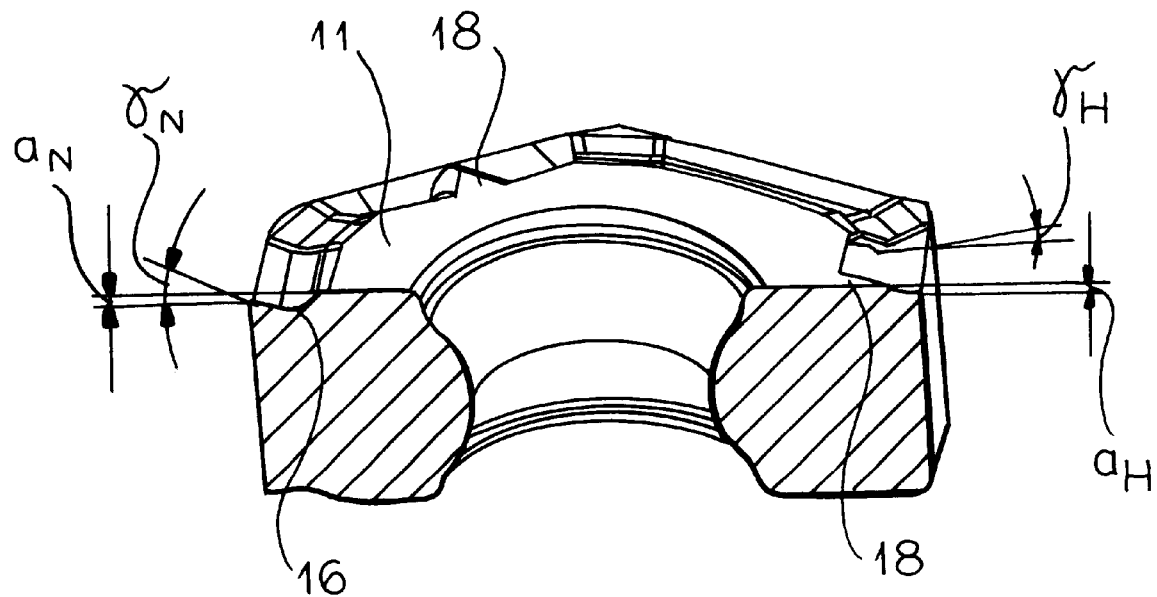
FIG. 4 is a section taken along line I—I of FIG. 3.

As shown in the sectional view of FIG. 4 the chip-shaping groove 16 running along the auxiliary cutting edge 14 is concave and the auxiliary-edge cutting angle $\gamma_N$ is 15°. The cutting surface at the part adjacent each main cutting edge drops to form a main-edge cutting angle $\gamma_H$ of 8°. The central cutting-surface plateau 11 is 0.03 mm higher than the main cutting edge as shown by the spacing $a_H$. The highest point of the convexly shaped auxiliary cutting edge is at an identical spacing $a_N$. The radius of curvature of the chip-shaping groove 16 at its base is 0.8 mm and the radius of curvature of the climbing flank to the central plateau 11 is 0.5 mm.

Figure 5:
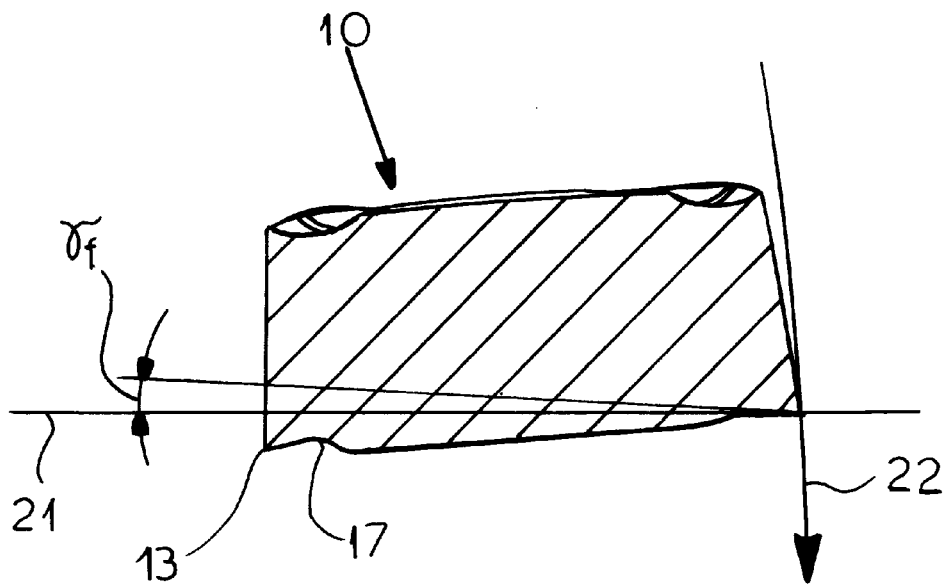
FIG. 5 is a section taken along line II—II of FIG. 2.

The sectional view of FIG. 5 shows the radial main-edge cutting angle $\gamma_f$ of the cutting insert in use position. The preferred radial main-edge cutting angle lies between 0° and 4°.

Figure 6:
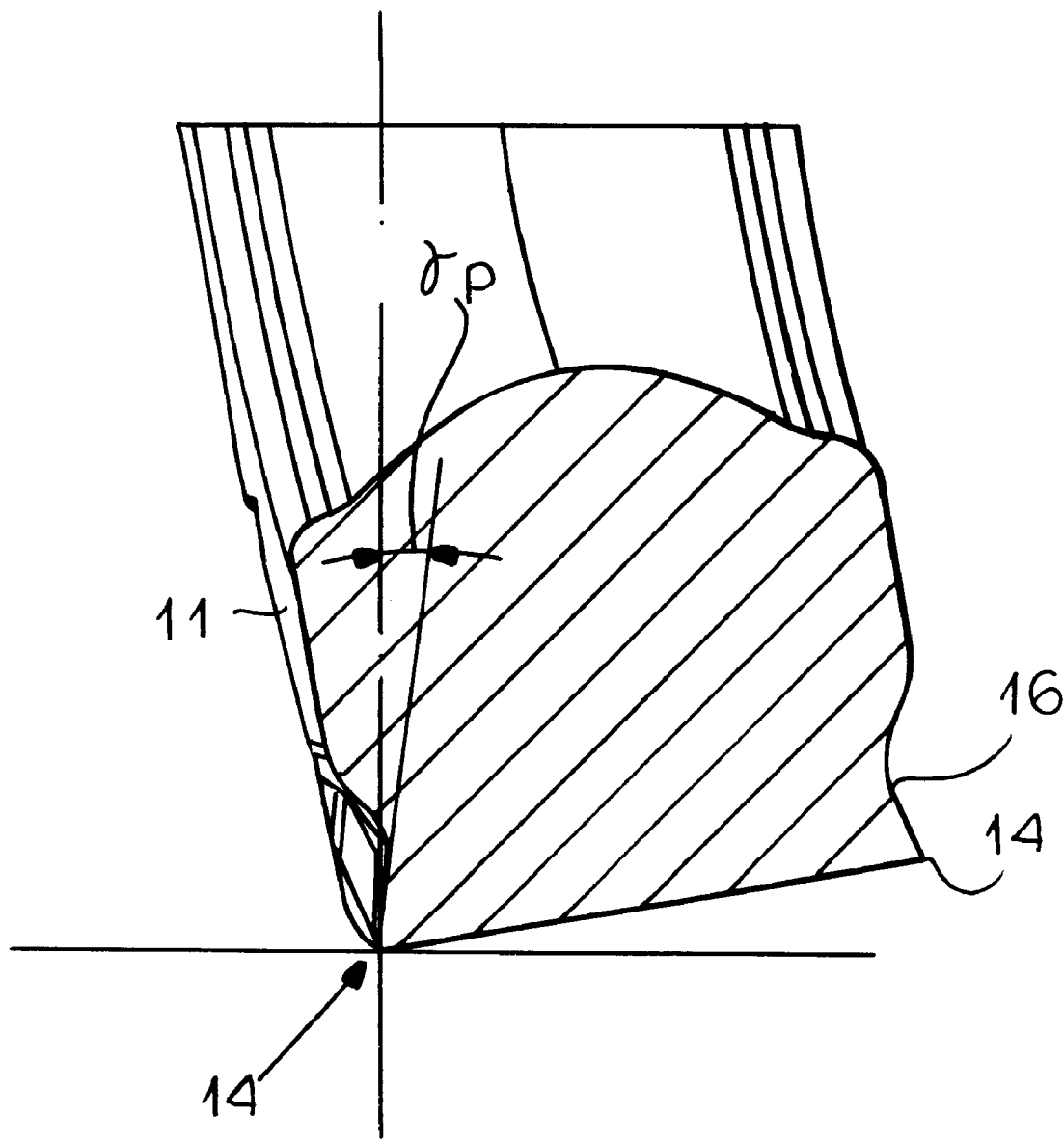
FIG. 6 is a section taken along line III—III of FIG. 2.

As shown in FIG. 6, the effective axial auxiliary-edge cutting angle $\gamma_p$ in use position is 5°.

Figure 7:
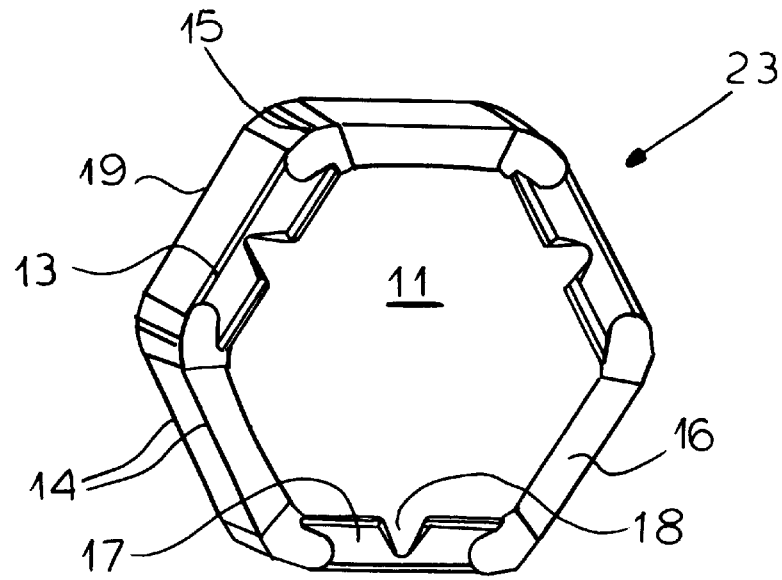
FIG. 7 is a perspective view of an indexable cutting plate as in FIG. 1 but without a mounting hole.

The indexable cutting insert 23 shown in FIG. 7 is different from the cutting plate of FIG. 1 in that it does not have a central mounting hole 12. The indexable cutting insert 23 is instead clamped by a mounting screw by means of a clamping wedge 24 as shown in more detail in FIG. 9.

Figure 8:
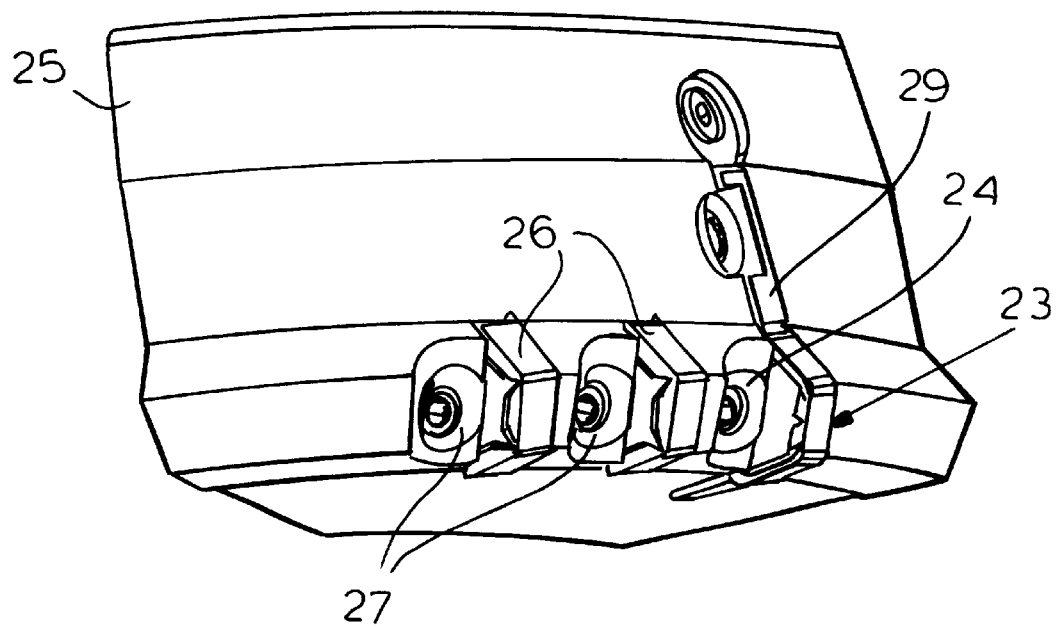
FIG. 8 is a partial view of a tool holder with several indexable cutting plates installed.
Figure 9:
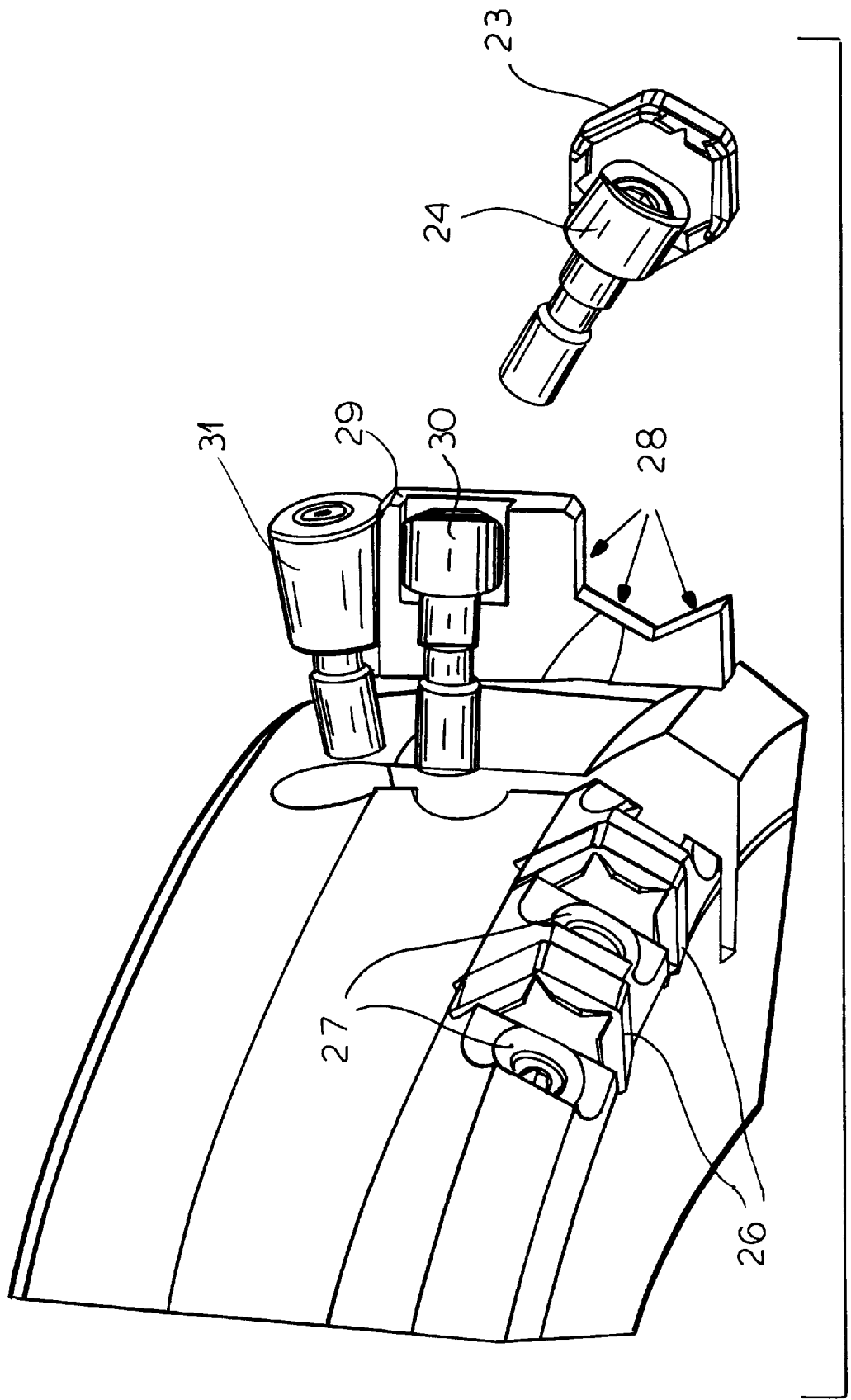
FIG. 9 is an exploded view of the parts of FIG. 8.

The indexable cutting insert 23 can be used as a finishing tool in a miller. As shown in FIGS. 8 and 9 the miller body 25 has several seats for cutting tools, namely cutting inserts 26 for roughing and the cutting insert 23 for finishing, all the cutting tools being held in place by clamping wedges 24 and 27.

The indexable cutting insert 23 is secured in the miller body 25 by being fitted in a seat 28 of an abutment 29 that is positioned and fixed by means of a clamping wedge 30 and an adjustment wedge 31. The cutting insert 23 is fixed in the axial direction by the above-mentioned clamping wedge 24.

What is claimed is:

1. A cutting insert formed with
   a substantially hexagonal cutting face having six sides forming three main cutting edges and three auxiliary cutting edges alternating with the main edges, each of the main cutting edges being substantially straight and each of the auxiliary cutting edges being outwardly convex,
   a plateau on the face, inward of the cutting edges, and defining a plane, and
   respective free surfaces each extending generally perpendicular to the plane from the cutting edges and meeting at corners between the edges, whereby the main cutting edges are usable for roughing and the auxiliary cutting edges for finishing.

2. The cutting insert defined in claim 1 wherein each auxiliary cutting edge and the respective free surface have a radius of curvature of between 40 mm and 50 mm.

3. The cutting insert defined in claim 1 wherein the insert is formed on the face along an entire length of and parallel to each auxiliary cutting edge with a respective curved groove.

4. The cutting insert defined in claim 3 wherein each groove has an outer flank extending to the respective auxiliary edge and forming with a plane of the plateau an angle of between 10° and 20°.

5. The cutting insert defined in claim 3 wherein each groove has a radius of curvature of between 0.5 mm and 0.8 mm.

6. The cutting insert defined in claim 3 wherein each groove extends into the corners.

7. The cutting insert defined in claim 1 wherein the insert is formed with a straight groove along an entire length of and parallel to each main cutting edge.

8. The cutting insert defined in claim 7 wherein each straight groove has an outer flank extending to the respective main edge and forming with a plane of the plateau an angle of at most 8°.

9. The cutting insert defined in claim 1 wherein the plateau defines a plane and the edges are offset from the plane.

10. The cutting insert defined in claim 1 wherein the insert is formed with two such cutting faces extending substantially parallel to each other, and each formed with three such main and three such auxiliary cutting edges.

11. The cutting insert defined in claim 1 wherein the cutting face is formed with a pointed nose-shaped extension of the plateau at a center of each of the main cutting edges.

12. The cutting insert defined in claim 11 wherein each extension is generally triangular and is symmetrical to a respective line perpendicular to the center of the respective main cutting edge.

13. The cutting insert defined in claim 1 wherein the corners are rounded.

14. The cutting insert defined in claim 13 wherein the corners have a radius of curvature of between 0.3 mm and 0.9 mm.

15. A milling tool comprising:
  a tool holder formed with a seat rotatable about a tool axis adjacent a workpiece plane generally perpendicular to the tool axis; and
  a cutting insert in the seat formed with
    a substantially hexagonal cutting face having six sides forming three main cutting edges and three auxiliary cutting edges alternating with the main edges, each of the main cutting edges being substantially straight and each of the auxiliary cutting edges being outwardly convex;
    a plateau on the face, inward of the cutting edges, and defining a plane, and
    respective free surfaces each extending generally perpendicular to the plane from the cutting edges and meeting at corners between the edges, whereby the main cutting edges are usable for roughing and the auxiliary cutting edges for finishing.

16. The milling tool defined in claim 15 wherein one of the main edges lies generally on the workpiece plane with the face forming at the one main edge an effective radial rake angle of between 0° and 4°.

17. The milling tool defined in claim 15 wherein one of the auxiliary edges lies generally on the workpiece plane with the face forming at the one auxiliary edge an effective axial cutting angle of between 5° and 10°.

18. The milling tool defined in claim 15 wherein one of the auxiliary edges lies generally on the workpiece plane with the face forming at the one auxiliary edge an effective radial cutting angle of between −5° and −10°.

* * * * *